United States Patent
Moliere et al.

(10) Patent No.: US 9,267,087 B2
(45) Date of Patent: Feb. 23, 2016

(54) METHOD OF OPERATING THERMAL EQUIPMENT FED WITH ALUMINUM AND TITANIUM IN ORDER TO REDUCE HIGH-TEMPERATURE CORROSION AND FOULING

(75) Inventors: Michel Moliere, Belfort (FR); Jean-Yves Regnier, Issenheim (FR)

(73) Assignee: GE Energy Products France SNC, Belfort (FR)

( * ) Notice: Subject to any disclaimer, the term of this patent is extended or adjusted under 35 U.S.C. 154(b) by 1425 days.

(21) Appl. No.: 12/873,145

(22) Filed: Aug. 31, 2010

(65) Prior Publication Data

US 2011/0056209 A1 Mar. 10, 2011

(30) Foreign Application Priority Data

Sep. 8, 2009 (EP) ..................................... 09305819

(51) Int. Cl.
*F23J 7/00* (2006.01)
*C10L 1/12* (2006.01)
*C10L 10/00* (2006.01)
*C10L 10/04* (2006.01)
*F02C 7/30* (2006.01)

(52) U.S. Cl.
CPC .............. *C10L 1/1208* (2013.01); *C10L 1/1216* (2013.01); *C10L 10/00* (2013.01); *C10L 10/04* (2013.01); *F02C 7/30* (2013.01); *F05D 2260/95* (2013.01); *Y02T 50/67* (2013.01)

(58) Field of Classification Search
CPC ............. F23J 2215/60; F23J 7/00; F23J 9/00; F23D 3/00; F23R 3/28
USPC ............................... 431/4, 181, 280; 110/342
See application file for complete search history.

(56) References Cited

U.S. PATENT DOCUMENTS

| 3,179,513 | A | * | 4/1965 | Toulmin, Jr. | ..................... 75/460 |
| 4,291,011 | A | * | 9/1981 | Griffiths | ........................ 423/625 |
| 4,836,993 | A | * | 6/1989 | Bertolacini et al. | ...... 423/244.04 |
| 5,120,695 | A | | 6/1992 | Blumrich et al. | |
| 5,256,389 | A | * | 10/1993 | Jordan et al. | ............... 423/592.1 |

FOREIGN PATENT DOCUMENTS

| EP | 09035819 | 1/2010 |
| GB | 697101 A | 9/1953 |
| GB | 762521 A | 11/1956 |

OTHER PUBLICATIONS

Moliere M. et al.: "EGT Experience with Gas Turbines Burning Ash-Forming Fuels", Technical Review GEC Alsthom, GEC Alsthom, Paris, FR, No. 11, Jan. 1, 1993, pp. 47-61.

Wang C-B et al.: "Low temperature complete combustion of methane over titania-modified alumina-supported palladium", FUEL, IPC Science and Technology Press, Guildford, GB, vol. 81, No. 14, Sep. 1, 2002, pp. 1883-1887.

* cited by examiner

*Primary Examiner* — Avinash Savani
(74) *Attorney, Agent, or Firm* — Mintz Levin Cohn Ferris Glovsky and Popeo, P.C.; Steven M. Jensen; Christopher R. Cowles

(57) ABSTRACT

The invention provides methods of operating thermal equipment, for example, gas turbines and methods for protecting hot parts of thermal equipment from, for example, corrosion by ash from an alkali metal or from lead; fouling by ash of an alkaline-earth metal, lead or a transition metal; and the combined effects of an alkali metal, lead, an alkaline-earth metal or a transition metal.

18 Claims, No Drawings

METHOD OF OPERATING THERMAL EQUIPMENT FED WITH ALUMINUM AND TITANIUM IN ORDER TO REDUCE HIGH-TEMPERATURE CORROSION AND FOULING

CROSS REFERENCE TO RELATED APPLICATION

This application claims priority to European patent application Ser. No. EP 09 305 819.6, filed Sep. 8, 2009, the disclosure of which is incorporated herein by reference in its entirety.

BACKGROUND OF THE INVENTION

In what follows, gas turbines are taken as reference thermal equipment and the following terminology is adopted:

the term "combustion fluid" refers to any liquid or gaseous fluid which is introduced into the combustion chamber of the thermal equipment, which category includes: (i) liquid or gaseous fuels and, by extension, fuels employed in particulate form, such as pulverized coal or sawdust, which may be injected under pressure into the combustion chambers and the physico-chemical characteristics of the combustion of which are similar to those of fluid fuels; (ii) the oxidizer (or combustion air) and (iii) certain auxiliary fluids such as: atomizing air, used to spray the liquid fuel into the combustion chamber; a fluid possibly used to introduce a combustion additive; water or steam possibly used to obtain particular effects, such as a reduction in $NO_x$ emissions ("deNO$_x$ steam or water") or an increase in power of the turbine;

the term "firing temperature" of a gas turbine refers not to the temperature within the flames but that of the combustion gases at their entry into the expansion turbine. This is a particularly important design parameter of gas turbines as it determines the maximum efficiency thereof;

the "hot parts" of thermal equipment are the components placed in the hot gas stream and comprise, in particular: the walls of the combustion chamber and its components, the combustion gas ducts and, depending on the type of equipment, the expansion turbine, the cylinders and pistons, tubes and walls of heat exchangers, etc. For example, in third-generation gas turbines, the firing temperature of which may reach 1400° C., the hottest parts are the components of the combustion system and of the expansion turbine, and mainly the parts of the first stage: stationary blades ("inlet guide vanes") and moving blades ("rotor blades"). Metallurgical constraints dictate that these components be internally cooled so that their skin temperature (i.e. the temperature of their walls) is below that of the combustion gases. In general, the temperatures to which the walls of the hot parts are exposed depend on many factors, among which are the type of equipment, its design (types of materials; presence or absence of internal cooling and surface heat shields) and its operating conditions. The temperature level may be considered to be between 800 and 950° C.;

"traces" denote residual concentrations of certain elements introduced into the combustion chamber;

"corrosive metals" comprise, in the present context, alkali metals (in particular Na and K) and lead, the ash of which causes, as primary effect, high-temperature corrosion of metal alloys; their ash and their deposits will also be termed "corrosive";

"fouling metals" or "Mf" essentially comprise alkaline-earth metals (particularly: Ca and Mg) and certain transition metals (particularly Cu, Ni and Zn), the ash of which tends to be deposited on the hot parts and to cause, as primary effect, fouling phenomena, i.e. the appearance and progressive growth of layers of hard deposits adhering to the hot parts; their ash and their deposits will also be termed "fouling"; lead also belongs to the category of fouling metals; and "deleterious metals" comprise corrosive metals and fouling metals; their ash and their deposits will also be termed "deleterious".

In thermal equipment, the combustion fluids often contain traces of certain deleterious metals which threaten, depending on the case, the metallurgical integrity of said equipment (in the case of corrosive metals), their energy performance (in the case of fouling metals) or both these aspects at the same time (in the presence of both types of metals). In particular, it should be stressed that the materials balance of deleterious metals must be considered within the combustion gases in which the hot parts are located or, which is equivalent, in the combustion chamber where the potentially contaminated combustion fluids are mixed together.

Among corrosive metals are alkali metals: traces of sodium and potassium are frequently conveyed by the combustion fluids, particularly by a liquid fuel or by "deNO$_x$ water", the traces usually being in the form of chlorides. In the flames, these chlorides react with sulphur brought by the fuel or the ambient air, so as to form the corresponding alkali metal sulphates, namely $Na_2SO_4$ and $K_2SO_4$. In the molten state, alkali metal sulphates constitute electrolytic media that are highly aggressive with respect to metal alloys and are capable of corroding those portions of hot parts on which they are deposited and remain for a long enough time. The melting point ("$T_m$") of pure $Na_2SO_4$ is for example 884° C., which temperature, as will be indicated below, may greatly decrease in the presence of other metal salts. In addition, it should be noted that liquid films of alkali metal sulphates are relatively fluid and therefore tend to flow along the walls under the effect of the gas streams that permanently sweep the hot parts. This reduces their chance of being lastingly attached to defined metal portions so that the cases of high-temperature corrosion are less frequent than if these films were to be stationarily attached to the same metal portions. Moreover, molten alkali metal sulphates have a non-negligible vapour pressure at high temperature, so that their deposition on the hottest parts (for example those of the first stage of an advanced-technology gas turbine) may be reduced by this vaporization phenomenon. However, in this case, sulphates are deposited on other parts, located further downstream, which are less hot.

The types of corrosion caused by alkali metal sulphates are usually called "type I" or "type II" high-temperature corrosion depending on their mechanism. In type I corrosion, the metal attack is uniform, with no pitting formation, whereas type II corrosion is characterized by the appearance of surface pitting and by the existence of an "induction period" before manifestation of the corrosion. This induction period corresponds to the pitting incubation time, which is shorter the more aggressive the medium and the lower the intrinsic resistance of the alloy, determined in particular by its chromium content.

Apart from the primary factors formed by the temperature and the alkali metal content in the combustion gases, other parameters are involved in type I or type II corrosion rates. Two factors are particularly important, as the Inventors have observed:

the $SO_x$ (i.e. $SO_2$ and $SO_3$) concentration in the combustion gases—increasing this concentration accelerates the corrosion and in particular shortens the induction period that precedes the appearance of pitting in type II corrosion; and the type of alloy: in fact, two main types of superalloys are used in the construction of gas turbines, namely, on the one hand, alloys called "chromia-forming alloys" developed in the 1960s and 1970s and typically used in the form of polycrystalline alloys in first- and second-generation turbines, these chromia-forming alloys developing, on their surfaces, passivation layers rich in chromium oxide ($Cr_2O_3$) which protect, within certain limits, the substrate from attack by molten sulphates and, on the other hand, so-called "alumina-forming" alloys which were developed more recently and are being used increasingly often in the fowl of single-crystal alloys in third-generation gas turbines, which have very high firing temperatures, these alumina-forming alloys developing surface layers rich in alumina which give them, compared with chromia-forming alloys, enhanced hot refractory and mechanical properties, but they have a much lower resistance to high-temperature corrosion.

With regard to fouling, several types of metals have effects to various degrees:

traces of calcium and magnesium generate calcium sulphate (anhydrite: $CaSO_4$) ash and magnesium sulphate ($MgSO_4$) ash, and also magnesium oxide ($MgO$), said traces generally coming from the fuel or from "$deNO_x$ water"—$CaSO_4$ has a very pronounced fouling effect; and traces of transition metals, which generate ash based on oxides and oxisulphates, may be provided by water contained in one of the combustion fluids. For example, the moisture contained in the combustion air or in the atomizing air could be in contact, upstream of the combustion chamber, with a galvanized or carbon steel structure, or else with a brass or cupro-nickel exchanger, and become laden with zinc, copper or nickel.

Finally, lead occupies a particular position among the deleterious metals, it being possible for lead-containing ash to have both a fouling role and a corrosive role. Traces of lead that may be encountered, albeit quite rarely, in certain fuels derived from petroleum (naphthas, gasoils) generally derive from accidental contamination by lead-containing petrol. Depending on the conditions (sulphur content of the fuel, temperature, presence or absence of alkali metals, etc.), the lead-containing ash may be fusible (the most general case) or refractory:

pure lead sulphur ($PbSO_4$) has a high melting point ($T_m$: 1075° C.) and is capable, when present in a high enough concentration, of generating fouling deposits;

nevertheless, depending on the temperature and the sulphur content of the fuel, $PbSO_4$ usually undergoes a desulphurization process, to form a series of oxisulphates having decreasing melting points: (i) PbO—$PbSO_4$ ($T_m$: 965° C.), (ii) $2PbO$—$PbSO_4$ ($T_m$: 932° C.), (iii) $4PbO$—$PbSO_4$ ($T_m$: 800° C.) and, finally, (iv) PbO ($T_m$: 885° C.). These phases are known for their very great corrosivity at high temperature.

Lead is therefore a metal which is both very corrosive and potentially fouling.

The fraction of ash resulting from the fouling metals, and deposited on the hot parts, undergoes a sintering phenomenon by prolonged exposure to high temperature: the deposits thus tend to become both hard and adherent, which, combined with their insolubility in water (or even their possible tendency to agglomerate and harden upon contact with water) makes them very difficult to remove and justifies their being called fouling deposits. Their main effect is the degradation in the performance of the thermal equipment, which degradation progressively increases as they accumulate, thereby resulting in: (i) a reduction in heat exchange coefficients; (ii) a deterioration in the aerodynamics of the gas flows; and (iii) in extreme cases, a reduction in hot-gas flow passage areas. It may then prove necessary for the thermal equipment to be partially dismantled, so as to manually restore its state of cleanliness and its performance.

In reality, traces of corrosive metals and fouling metals are usually present simultaneously, and secondary deleterious effects may result from a combination thereof. Firstly, attachment of anhydrite $CaSO_4$ particles on the walls is facilitated by traces, even minute traces, of molten alkali metal sulphates. Secondly, the sulphates resulting from fouling metals (Mf) often combine with those of alkali metals (Ma) to give double sulphates of the $MfSO_4$-$Ma_2SO_4$ type or even triple sulphates of the $MfSO_4$-$Ma_2SO_4$-$Ma'_2SO_4$ type, which hereafter will be called "complex salts". These complex salts often have initial melting temperatures (or solidus temperatures) below the wall temperature of the hot parts, which enables them to adhere thereto.

For example:

$CaSO_4$ ($T_m$~1450° C.) forms, with $Na_2SO_4$ and $K_2SO_4$, complex salts of the $(Na,K,Ca)(SO_4)$ type, the three eutectics, two binary and one ternary, of which have the following respective compositions:

50% $Na_2SO_4$-50% $CaSO_4$ ($T_m$: 916° C.);
62% $K_2SO_4$-38% $CaSO_4$ ($T_m$: 867° C.) and
31% $Na_2SO_4$-29% $K_2SO_4$-40% $CaSO_4$ ($T_m$~800° C.);

$MgSO_4$ likewise forms three eutectics:
56% $Na_2SO_4$-44% $MgSO_4$ ($T_m$: 662° C.);
72.5% $Na_2SO_4$-27.5% $MgSO_4$ ($T_m$: 750° C.),
13% $Na_2SO_4$-55% $K_2SO_4$-32% $MgSO_4$ ($T_m$: 670° C.);

$PbSO_4$ forms, with $Na_2SO_4$, the eutectic:
53% $Na_2SO_4$-47% $PbSO_4$ ($T_m$: 730° C.);

$ZnSO_4$ forms the eutectic:
45% $Na_2SO_4$-55% $ZnSO_4$ ($T_m$: 472° C.);

$NiSO_4$ forms the eutectic:
62% $Na_2SO_4$-38% $NiSO_4$ ($T_m$: 665° C.) and $CuSO_4$ forms the eutectics:
53% $Na_2SO_4$-47% $CuSO_4$ ($T_m$: 537° C.) and
55% $K_2SO_4$-45% $CuSO_4$ ($T_m$: 460° C.).

It should be noted that, although magnesium, lead and transition metal (Cu, Zn, Ni) sulphates are of limited thermal stability and decompose into oxisulphates or oxides at high temperature, they are stabilized when they are combined with alkali metal sulphates in the above complex salts. Moreover, these combinations reduce the vapour pressure and consequently the vaporization of alkali metal sulphates and therefore tend to accentuate their corrosive effect. Finally, whereas molten alkali metal sulphates are very fluid in the pure state and tend to flow along the hot walls, these complex salts are in general viscous or even have a "pasty" consistency. Consequently, not only do they become attached more easily to the metal walls and participate in the fouling and corrosion processes, but they also play in turn the role of "adhesive" with respect to various liquid or solid particles that may strike said walls. This leads to local build-up of scoria and to aggravated fouling and/or corrosion effects. To summarize, there are secondary deleterious effects which may be termed "synergistic" and which result from physico-chemical interactions between the ash of the various deleterious metals. While alkali metal sulphates play the role of fluxing agents with respect to particles containing fouling metals, the sulphates of fouling metals play the reverse role of "thickeners" with respect to the first sulphates. Lead may itself play both these roles or act in combination with the other deleterious metals.

In what follows, "oxisulphate-containing ash" will be used, for the sake of simplification, to denote all of the following compounds: sulphates, oxisulphates, complex salts and oxides of deleterious metals present at the combustion chamber exit.

Among the drawbacks that have been described above, high-temperature corrosion has the most dangerous effects as it may lead to hot parts fracturing, which occurs not only unexpectedly but may also cause, in the case of rotating machines, a cascade of destructions resulting in very expensive repairs and lengthy down-times of the equipment.

Lead contamination is rare but may be substantial, and at the present time there exists no method of inhibiting lead-induced high-temperature corrosion.

The other deleterious metals are practically always present in the trace state and their strict absence is very difficult to ensure under industrial exploitation conditions of thermal equipment. For example, even if the operator could provide, for a certain extra-cost, a gasoil free of metal contamination, especially free of sodium, this level of purity cannot be guaranteed during the subsequent transportation phases (the problem of keeping pipelines, wagons or tankers clean) and may also become degraded in the storage tanks of the power station through the tank "breathing" effect (ingress of air as a result of variations in level and in day/night temperature cycles).

From another standpoint, biofuels consisting of either a primary biomass (wood, straw, agricultural production residues, vegetable oils obtained by trituration of oleaginous grains, etc.) or a secondary biomass (ethanol, vegetable oils methyl esters (VOME), etc.), which biomasses are having to be developed as substitutes, or as complementary fuels, for fossil fuels in various types of thermal equipment, are very often contaminated with metal. For example, in the case of a primary biomass and VOME biofuels, calcium is mainly found as fouling metal and potassium as corrosive metal. Even if the biofuels have a very low sulphur content owing to their plant origin, their sulphur contents, of the order of a few mg/kg, which are added to the residual sulphur contents provided by the ambient air, are in general sufficient to produce oxisulphate-containing ash in the flames. As a consequence, biomass combustion has potentially deleterious effects on thermal equipment, which are similar in their nature to those of fossil fuels, but with potentially more intense effects because of the higher original metal contamination levels.

There is therefore an increasing conflict between, on the one hand, the requirement—dictated by the design of thermal equipment with the highest performance, including modern gas turbines—to supply very pure and therefore expensive fuel and, on the other hand, the need to maintain operating costs at a sustainable level.

Moreover, because of the ever lower levels of metal contamination required by gas turbines of the latest generation because of their increasing firing temperatures, the problems described above may affect not only units burning liquid fuels but also those which burn very pure commercial gases and that are installed in marine or industrial atmospheres, i.e. in salt-contaminated environments, knowing that the techniques currently available for removing these salts from the air are very expensive and their efficiency is tricky to control.

With regard to corrosion by alkali metals and more particularly by sodium, the patents FR 1 207 857 from Continental Oil (1959) and U.S. Pat. No. 3,018,172 from Tillman (1962) on the one hand teach the beneficial effect provided by aluminum compounds—aluminum being termed in what follows an "active" metal—over trial times of 50 hours and, on the other hand, disclose Al/Na doses of between 2 and 6 by weight. However, the Inventors have observed that such a protection method has shortcomings in a great number of situations:

(a)—either in the case of durations greatly longer than 50 hours, corresponding in fact to industrial operating conditions of the equipment. For example, in one of the trials carried out by the Inventors, test specimens made of a nickel-based superalloy GTD111 were kept in prolonged contact at 900° C. with a sodium sulphate bath to which alumina had been added in an Al/Na mass ratio of 2.5, which specimens, after 200 hours, suffered intense pitting corrosion. This aspect could not have been observed by Tillman, the test times for which did not exceed 50 hours, which is shorter than the pitting induction period prevailing under these conditions;

(b)—or in the presence of fouling metals tending to form "complex sulphates" with alkali metal sulphates according to the mechanisms described above. For example, in another trial carried out by the Inventors, the 50% $Na_2SO_4$/50% $CaSO_4$ eutectic mixture ($T_m$: 916° C.) resulted, at a temperature of 950° C., in pitting of the GTD111 test specimens more rapidly than in the absence of calcium, for the same Al/Na dosage; moreover, a highly viscous layer of the eutectic was observed to form at high temperature around the part, which, after cooling, left a highly adherent coating;

(c)—or in the presence of high $SO_x$ contents in the combustion gases (due to the high sulphur contents of the fuel). In another series of trials carried out by the Inventors, an Al/Na mass dosage of 3, which had provided effective protection of the GTD111 superalloy at 900° C. over a duration of 400 hours, for a 50 ppm $SO_x$ content, allowed pitting to develop after about 300 hours when this content was adjusted to 200 ppm; and (d)—or, finally, in the case of alumina-forming superalloys. For example, the Inventors have observed that an Al/Na dosage of 3, which correctly protected the GTD111 alloy (containing 14% Cr and 3% Al), at 900° C., over a period of 400 hours and in the presence of 50 ppm of sulphur, gave poor results with the alumina-forming alloy N5 (containing 7.6% Cr and 6% Al) under the same conditions.

The Inventors have also observed that the sodium sulphate used during the tests is unaltered at the end of the trials, which indicates the absence of a reaction between the sulphate and the alumina used or the aluminum salt used (which releases alumina when hot).

To summarize, the Inventors' analysis of the close links between the fouling and corrosion processes at high temperature shows that it is not a question of seeking to remedy the two effects independently, but rather, on the contrary, of having to address the causes of both problems simultaneously. This simultaneous approach would be a novel approach for maintaining integrity and performance in thermal equipment.

Moreover, the work carried out by the Inventors clearly confirms the beneficial effect of aluminum in the high-temperature corrosion by alkali metal sulphates. However, it also shows that long-term protection is very difficult to achieve. In particular when the corrosive conditions of the trial are exacerbated (using either a higher $SO_x$ content or a corrosive medium containing a fouling metal) or else when a less-resistant superalloy is used, the aluminum dosage must be increased and it is difficult to define a dosage which provides protection over a long period, knowing that the corrosion trials to be carried out then become very long (and expensive)

owing to an increase in the pitting induction period. The results of these studies also suggest that the permanence of the risk of pitting corrosion may be linked to the absence of a chemical reaction between the aluminum and the alkali metal sulphate, which therefore retains its corrosive properties.

Finally, no method exists at the present time for modifying the ash that enables the fouling effects of alkali-earth and transition metals to be eliminated.

SUMMARY OF THE INVENTION

The invention provides a method for simultaneously reducing high-temperature corrosion and formation of fouling deposits within thermal equipment intended for the production of heat, mechanical energy or electrical energy, for example gas turbines, diesel engines, boilers, furnaces, incinerators, aircraft jet engines, etc.

Thus, in one aspect, the invention provide a method of operating thermal equipment, wherein the thermal equipment comprises a fuel and an oxidizer and is fed with a number of fluids, at least one of which fluids includes at least one metal selected from the group consisting of alkali metals, lead, alkaline-earth metals and transition metals. The method comprises feeding the thermal equipment with aluminum and titanium, wherein the titanium mass fraction of the compounds is defined by the expression $[Ti]/([Al]+[Ti])$, in which $[Ti]$ and $[Al]$ represent the titanium mass concentration and aluminum mass concentration, respectively, in all the fluids feeding the thermal equipment, and wherein the titanium mass fraction has a value equal to or greater than 0.1.

In one embodiment, the transition metal is nickel, copper or zinc.

In another embodiment, the aluminum and titanium are fed to the thermal equipment in the form of compounds comprising aluminum and titanium.

In yet another embodiment, the titanium mass fraction is either: (i) between 0.4 and 0.6 when Y is equal to $(1.5*[Ca]+0.5*[Mg])$ or equal to $0.5*([Zn]+[Cu]+[Ni])$; or (ii) between 0.1 and 0.3 when Y is equal to $([Na]+[K])$ or $[Pb]$. In one embodiment, the titanium mass fraction is equal to 0.5 when Y is equal to $(1.5*[Ca]+0.5*[Mg])$ or Y is equal to $0.5*([Zn]+[Cu]+[Ni])$. In another embodiment, the titanium mass fraction is equal to 0.2 when Y is equal to $([Na]+[K])$ or $[Pb]$.

In still another embodiment, the compounds comprising aluminum and titanium are fed at a dosage ratio R, defined by the expression $([Al]+[Ti])/[Y]$ in which $[Y]$ represents the maximum of the following values: $([Na]+[K])$; $(1.5*[Ca]+0.5*[Mg])$; $[Pb]$; $0.5*([Zn]+[Cu]+[Ni])$ and the generic notation $[M]$ denotes the mass concentration of the metal "M" in all the fluids supplying the combustion chamber, wherein R is equal to or greater than 2.5. In one embodiment, the dosage ratio R is:
  (i) between 2.5 and 3.5 when Y is equal to $(1.5*[Ca]+0.5*[Mg])$ or equal to $0.5*([Zn]+[Cu]+[Ni])$;
    (ii) between 4 and 5 when Y is equal to $([Na]+[K])$ or $[Pb]$, when the thermal equipment does not include parts made of an alumina-forming superalloy and when the $SO_x$ content in the combustion products does not exceed 50 ppm by volume; or
    (iii) between 4.5 and 5.5 when Y is equal to $([Na]+[K])$ or $[Pb]$ and when the thermal equipment includes parts made of an alumina-forming superalloy or when the $SO_x$ content in the combustion products exceeds 50 ppm by volume.

In related embodiments, the dosage ratio R is equal to 3 when Y is equal to $(1.5*[Ca]+0.5*[Mg])$ or Y is equal to $0.5*([Zn]+[Cu]+[Ni])$; the dosage ratio R is equal to 4.5 when Y is equal to $([Na]+[K])$ or $[Pb]$; and/or the dosage ratio R is equal to 5 when Y is equal to $([Na]+[K])$ or $[Pb]$ and when the thermal equipment includes parts made of an alumina-forming superalloy or when the $SO_x$ content in products of combustion exceeds 50 ppm by volume.

In one embodiment, the compounds comprising aluminum and titanium are in a form selected from the group consisting of a liposoluble form, a water-soluble form, a water-in-oil emulsion or microemulsion; an oil-in-water emulsion or microemulsion, an aqueous suspension and an organic suspension. In one embodiment, the compounds comprising aluminum and titanium are the form of an aqueous or an organic nanoscale suspension.

In another embodiment, the thermal equipment comprises a combustion chamber and the method further comprises feeding the compounds comprising aluminum and titanium into the combustion chamber.

In yet another embodiment, the thermal equipment is selected from the group consisting of gas turbines, diesel engines, boilers, furnaces, incinerators and aircraft jet engines. In one embodiment, the thermal equipment is a gas turbine, for example one having a firing temperature that is equal to or greater than 900° C.

Another aspect of the invention provides a method for protecting hot parts of thermal equipment from:
  (i) corrosion by ash from an alkali metal or from lead;
  (ii) fouling by ash of an alkaline-earth metal, lead or a transition metal; and
  (iii) the combined effects of an alkali metal, lead, an alkaline-earth metal or a transition metal;
wherein the thermal equipment comprises a fuel and oxidizer and is fed with a number of fluids, at least one of which fluids includes at least one metal selected from the group consisting of alkali metals, lead, alkaline-earth metals and transition metals, the method comprising feeding the thermal equipment with aluminum and titanium, wherein the titanium mass fraction of the compounds is defined by the expression $[Ti]/([Al]+[Ti])$, in which $[Ti]$ and $[Al]$ represent the titanium mass concentration and aluminum mass concentration, respectively, in all the fluids feeding the thermal equipment, and wherein the titanium mass fraction has a value equal to or greater than 0.1

In one embodiment, the transition metal is nickel, copper or zinc.

In another embodiment, the aluminum and titanium are fed to the thermal equipment in the form of compounds comprising aluminum and titanium.

In one embodiment, the titanium mass fraction is either: (i) between 0.4 and 0.6 when Y is equal to $(1.5*[Ca]+0.5*[Mg])$ or equal to $0.5*([Zn]+[Cu]+[Ni])$; or (ii) between 0.1 and 0.3 when Y is equal to $([Na]+[K])$ or $[Pb]$.

In another embodiment, the compound comprising aluminum and titanium are fed at a dosage ratio R, defined by the expression $([Al]+[Ti])/[Y]$ in which $[Y]$ represents the maximum of the following values: $([Na]+[K])$; $(1.5*[Ca]+0.5*[Mg])$; $[Pb]$; $0.5*([Zn]+[Cu]+[Ni])$ and the generic notation $[M]$ denotes the mass concentration of the metal "M" in all the fluids supplying the combustion chamber, wherein R is equal to or greater than 2.5. In one embodiment, the dosage ratio R is:
  (i) between 2.5 and 3.5 when Y is equal to $(1.5*[Ca]+0.5*[Mg])$ or equal to $0.5*([Zn]+[Cu]+[Ni])$;
  (ii) between 4 and 5 when Y is equal to $([Na]+[K])$ or $[Pb]$, when the thermal equipment does not include parts made of an alumina-forming superalloy and when the $SO_x$ content in the combustion products does not exceed 50 ppm by volume; or (iii) between 4.5 and 5.5 when Y is equal to ([Na]+[K]) or [Pb] and when the thermal equipment includes parts made of an alumina-forming superalloy or when the $SO_x$ content in the combustion products exceeds 50 ppm by volume.

DETAILED DESCRIPTION OF THE INVENTION

Consequently, it is desirable to have a method that protects the hot parts of the thermal equipment (including the parts made of alumina-forming alloys) from the corrosion and fouling induced by the deleterious metals and in the presence of sulphur oxide in a variable amount in the combustion fluids of said thermal equipment, for long operating times and without the operator having to apply constricting and expensive purification treatments to the combustion fluids.

The Inventors have discovered that it is possible to achieve this objective by combining with the first active metal, namely the aluminum, a "second active metal", namely titanium. These novel additive formulations based on aluminum and titanium compounds will be called, in the rest of the description, "aluminum-titanium additives" or "hybrid additives" for the sake of simplification.

In the rest of the description, the following conventions will be adopted:

the concentration of deleterious metals (alkali, alkaline-earth and transition metals; lead) and of active metals (Al and Ti) present in the combustion chamber or, which is equivalent, in the combustion gases, will be expressed in mass fowl (for example in mg/kg) relative to the fuel flow rate. Thus, for any metal X, its "net concentration" [X] is defined as the sum of the concentration of this metal over all the combustion fluids, the concentrations being weighted by the mass flow rate of each carrier fluid and relative to the fuel flow rate. For example, a gas turbine may be considered in which the air mass flow rate ($Q_a$) is 40 times higher than the fuel flow rate ($Q_f$) and in which "$deNO_x$ water" is injected with a water mass flow rate ($Q_w$) equal to 0.5 times the fuel mass flow rate. If the sodium concentration in the fuel is $[Na]_f=1$ mg/kg, the sodium concentration in the air is $[Na]_a=0.01$ mg/kg and the sodium concentration in the "$deNO_x$ water" is $[Na]_a=0.02$ mg/kg, then the "net concentration" $[Na]_t$ which is the sodium concentration in all the fluids feeding the combustion chamber with sodium (or, which amounts to the same thing, in the combustion gases), is by definition:

$$[Na]_t = \frac{[Na]_a \times Q_a + [Na]_f \times Q_f + [Na]_w \times Q_w}{Q_a + Q_f + Q_w}$$

In practice, the "net concentration relative to the fuel", denoted by the index "t/f" is often considered (here: "$[Na]_{t/f}$"), given by the expression:

$$[Na]_{t/f} = [Na]_t \times \frac{(Q_a + Q_f + Q_w)}{Q_f}$$
$$= [Na]_f + [Na]_a \times \frac{Q_a}{Q_f} + [Na]_w \times \frac{Q_w}{Q_f}$$

The "net concentration relative to the fuel" is often used in practice as it appears as the sum of the concentration in the fuel (the term $[Na]_f$), which is in general the highest concentration, and of the concentrations in the other fluids (the terms $[Na]_a$ and $[Na]_w$ which are respectively weighted ratios ($Q_a/Q_f$) and ($Q_w/Q_f$) and are very often minor. Moreover, the purity specifications for manufacturers usually involve net concentrations relative to the fuel.

However, since the net concentration is proportional to the net concentration relative to the fuel, it does not matter, when a ratio of the concentrations of two metals under identical operating conditions of the thermal equipment is expressed, whether the ratio of the net concentrations or the ratio of the net concentrations relative to the fuel is taken.

In the numerical example in question, the "net concentration relative to the fuel" is given by:

$$[Na]_{t/f}=1+0.01*40+0.02*0.5=1.41 \text{ mg/kg}.$$

The "net concentration" is itself 41.5 times lower, either 0.034 mg/kg, or 34 μg/kg (($Q_a+Q_f+Q_w)/Q_f=41.5$).

As regards the active metals (Al and Ti), it should be noted that it is natural to also relate their concentrations to the fuel flow rate, since they are usually introduced into the fuel;

"Y" will denote the maximum of the following four values involving the mass concentrations of the deleterious metals: [Na]+[K]; 1.5*[Ca]+0.5*[Mg]; [Pb]; and 0.5*([Ni]+[Zn]+[Cu]), i.e.:

$$Y=\max\{[Na]+[K]; 1.5*[Ca]+0.5*[Mg]; [Pb]; 0.5*([Ni]+[Zn]+[Cu])\}.$$

The contamination will be said to be of "predominantly corrosive" effect when Y=[Na]+[K] or when Y=[Pb]. Conversely, the contamination will be said to be of "predominantly fouling" effect when Y=1.5*[Ca]+0.5*[Mg] or when Y=0.5*([Ni]+[Zn]+[Cu]);

the dosage of the hybrid additive, defined by the "dosage ratio", denoted by R, is given by the expression:

$$R = \frac{[Al] + [Ti]}{Y}; \text{ and} \quad (1)$$

finally, the "relative mass fractions" (or more simply the "mass fractions") of Al and Ti are defined by the ratios:

$$a = \frac{[Al]}{[Al] + [Ti]}, \text{ and } t = \frac{[Ti]}{[Al] + [Ti]}. \quad (2)$$

Therefore:

$$a+t=1. \quad (3)$$

It should be noted that these mass fractions are, because of the definition of [Al] and [Ti], defined in the combustion chamber or else, which amounts to the same thing, in the combustion gases. However, when the combustion fluids other than the additive do not contain aluminum or titanium—which is by far the most frequent case—the mass fractions "a" and "t" also represent the fractions of Al and Ti present in the additive.

The Inventors have established that the "aluminum-titanium" additives ensure, by means of judicious dosing conditions, both a large reduction in fouling and effective corrosion protection over a long period even in the case of alumina-forming alloys, in the presence of complex salts of deleterious metals and in the presence of high $SO_x$ concentrations. Moreover, said additives meet industrial requirements of being of moderate cost, non-toxic and environmentally friendly.

From the chemical standpoint, it has been observed that the ash thus modified is mainly:

in the case of modified calcium-containing ash: CaTiO$_3$ (perovskite; T$_m$=1972° C.) and CaAl$_4$O$_7$ (T$_m$=1765° C.) as major phases; CaAl$_{12}$O$_{19}$ (T$_m$=1875° C.) as phase present in a moderate amount, and 4CaO·3Al$_2$O$_3$—SO$_3$ (T$_m$=1350° C.) as minor phase;

in the case of modified magnesium-containing ash: MgTiO$_3$ (T$_m$=1664° C.); MgAl$_2$O$_4$ (T$_m$=2105° C.);

in the case of modified lead-containing ash: PbTiO$_3$ (T$_m$=1294° C.) and PbAl$_{12}$O$_{19}$ (T$_m$>1000° C.);

in the case of modified nickel-based phases: NiAl$_2$O$_4$ (T$_m$=2100° C.), (NiO—Al$_2$O$_3$) solid solutions; NiTiO$_3$ (T$_m$=1610° C.);

in the case of modified copper-containing ash: 2CuO—Al$_2$O$_3$ (T$_m$=1260° C.) and CuTiO3; and in the case of modified zinc-containing ash: ZnTiO$_3$, ZnO—Al$_2$O$_3$ (T$_m$~1950° C.).

For the sake of simplification, these various salts, solid solutions and double oxides will be denoted by "aluminates" and "titanates" respectively.

From the standpoint of the mechanisms involved in reducing the fouling deposits, the studies carried out by the Inventors show the existence of several processes:

firstly, the particles of the hybrid additive fix, by interception and absorption, the deleterious metal oxisulphate-containing ash according to a "in-flight capture" process which starts firstly in the flames (i.e. within a temperature range of around 1400 to 2100° C.) and then in the "post-flame" zone, i.e. in the zone lying between the flames and the set of hot parts located immediately downstream of the combustion system (i.e. within a temperature range of the order of 1400 to 1000° C.), these two temperature ranges being provided by way of indication; and secondly, those of said particles which are deposited on the surface of the hot parts are the sites of the following processes:

a—the hybrid additive releases titanium oxide TiO$_2$ and aluminum oxide Al$_2$O$_3$;

b—the two oxides Al$_2$O$_3$ and TiO$_2$ are active with respect to the fouling-metal and lead oxisulphate-containing ash, which decomposes to form the abovementioned aluminates and titanates respectively, both being highly refractory compounds. The remarkable activity of each of these oxides makes it possible to envisage using either pure Al$_2$O$_3$ or pure TiO$_2$ for the anti-fouling function. Nevertheless, the simultaneous use of two oxides is advantageous because of the partial formation of aluminum titanate TiAl$_2$O$_5$: this hybrid oxide, characterized by a stoichiometric mass ratio Ti/(Ti+Al) of 0.47 (close to 0.5), forms at very high temperature and is stable only above 1100° C.; it has antifriction properties that tend to reduce the deposition of fouling ash particles. Finally, aluminum titanate is easily decomposed by the fouling-metal oxisulphate-containing species according to reactions of the type:

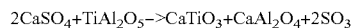

2CaSO$_4$+TiAl$_2$O$_5$->CaTiO$_3$+CaAl$_2$O$_4$+2SO$_3$

To promote its formation in the case of fouling contaminations, it will thus be beneficial to take a Ti mass fraction (i.e. [Ti]/([Ti]+[Al])) close to 0.5.

c—Al$_2$O$_3$ cannot decompose alkali metal sulphates as the alkali metal aluminates ("MaAl$_2$") capable of forming are unstable under the temperature and SO$_x$ and H$_2$O partial pressure conditions prevailing near the walls of the hot parts. The inhibiting action of Al$_2$O$_3$ therefore does not reside in the decomposition of the alkali metal sulphates. A more thorough study carried out by the Inventors has shown that its role, which is indirect, lies in its capability of destroying the corrosive eutectic seeds on the surface of the material. Specifically, the attack by Na$_2$SO$_4$, in the presence of SO$_2$ and O$_2$, of nickel-based superalloys starts with the formation of a corrosive fusible eutectic, such as one with 62% Na$_2$SO$_4$/38% NiSO$_4$ (T$_m$: 670° C.); an addition of Al$_2$O$_3$ on the surface of the alloy blocks the appearance of this eutectic since, as confirmed by the Inventors, Al$_2$O$_3$ decomposes the NiSO$_4$ seeds, to form the spinel NiAl$_2$O$_4$, which is very stable and does not form a corrosive eutectic; and d—On the other hand TiO$_2$ has the capability of reacting with corrosive alkali metal sulphates, which it decomposes into titanates (such as "Ma$_2$TiO$_3$" and "Ma$_2$Ti$_3$O$_7$") thereby constituting an essential contribution of the titanium in the corrosion inhibition process. However, the compound TiAl$_2$O$_5$ is less reactive than TiO$_2$ with respect to alkali metal sulphates and it is therefore necessary to avoid, in the case of predominantly corrosive contamination, a titanium mass fraction close to 0.5—a value oft close to 0.2 is preferable in this case.

The effectiveness of the hybrid additive is therefore explained by the coupled action of the oxides TiO$_2$ and Al$_2$O$_3$, the former very effectively "neutralizing" the alkali metal sulphates and the latter destroying the surface high-temperature corrosion seeds, both oxides being active with respect to the calcium, magnesium, lead and transition-metal oxisulphate phases.

Moreover, the Inventors have observed that TiO$_2$ decomposes not only the oxisulphate-containing ash according to the above mechanism but also the chlorides and carbonates of the deleterious metals with formation of titanates. This has a particular advantage when the sulphur content is insufficient to form, quantitatively, deleterious metal sulphates in the combustion chambers, something which may occur in the case of fuels not containing sulphur, such as very pure natural gas and on sites free of sulphur-containing pollution, such as in rural areas. Thus, even in the absence of sulphur or in the presence of extremely low sulphur contents, the chloride or carbonate ash that then forms, depending on the case, is decomposed by TiO$_2$ and the objective of modifying the ash is also achieved.

Finally, the Inventors have established that, unlike the oxisulphate-containing ash, the ash based on aluminum and titanium produced by the hybrid additives has particularly favourable physico-chemical properties, namely:

they take the form of particles of extremely fine particle size and are also highly friable;

they are not abrasive because the TiO$_2$ and Al$_2$O$_3$ crystallites that form "flight" from the hybrid additive are extremely small in size and of very low crystallinity, owing to the very short time that elapses between their generation and their impact on the hot parts;

their deposition on the metal parts is limited, especially owing to the abovementioned aluminum titanate formation, which is also reversible: the deposited particles do not adhere to the surfaces and the thickness of the deposit reaches a low steady-state value indicating the phenomenon of the ash particles already deposited being displaced by new particles; and they may be removed, if necessary, by mild mechanical treatments or by washing with water (which treatments act by producing an entrainment effect and not by dissolution) knowing that the ash thus modified does not set upon contact with water. For comparison, in the case of calcium-containing contamination not treated with a hybrid inhibitor, the hot parts would be covered with hard deposits of anhydrite (CaSO$_4$) which would be converted, by hydration in contact with water, to calcium sulphate hemihydrate ($CaSO_4 \cdot 0.5H_2O$) or to gypsum ($CaSO_4$-$2H_2O$), which are hard and water-insoluble phases.

Such a method makes it possible to reduce the formation of deleterious deposits in thermal equipment by modifying the chemical composition of the ash during combustion, so as to eliminate their corrosive and/or fouling character. Thus, the oxisulphate-containing ash of deleterious metals is replaced with novel non-adherent refractory crystalline phases, which are transported in the form of fly ash along the stream of hot gases and expelled out of the thermal equipment. It should be noted that this method, because it is implemented in the combustion chamber, makes it possible to treat not only the metals contained in the fuel but also those conveyed by the other combustion fluids. On another hand, the modified ash is non-adherent at high temperature, since it is solid and not liquid, even partially, nor even of pasty consistency. In other words, the modified ash is refractory and has a solidus temperature well above the wall temperatures.

The invention relates to a method of operating thermal equipment fed with a number of fluids, comprising a fuel and an oxidizer, in which at least one of the fluids includes at least one metal belonging to the group formed by: alkali metals, lead, alkaline-earth metals and transition metals such as nickel, copper and zinc. In particular, said thermal equipment is also fed with compounds comprising aluminum and titanium, and the titanium mass fraction [Ti]/([Al]+[Ti]), is equal to or greater than 0.1.

In one embodiment, the dosage ratio R, defined by the expression ([Al]+[Ti])/[Y] in which [Y] represents the maximum of the following values: ([Na]+[K]); (1.5*[Ca]+0.5*[Mg]); [Pb]; 0.5*([Zn]+[Cu]+[Ni]) and the generic notation [M] denotes the mass concentration of the metal "M" in all the fluids supplying the combustion chamber, is equal to or greater than 2.5.

In another embodiment, the dosage ratio R is: (i) between 2.5 and 3.5, in one embodiment equal to 3, when Y is equal to (1.5*[Ca]+0.5*[Mg]) or equal to 0.5*([Zn]+[Cu]+[Ni]); (ii) between 4 and 5, in one embodiment equal to 4.5, when Y is equal to ([Na]+[K]) or equal to [Pb], when the thermal equipment does not include parts made of an alumina-forming superalloy and when the $SO_x$ content in the combustion products does not exceed 50 ppm by volume; and (iii) between 4.5 and 5.5, in one embodiment equal to 5, when Y is equal to ([Na]+[K]) or equal to [Pb] and when the thermal equipment includes parts made of an alumina-forming superalloy or when the $SO_x$ content in the combustion products exceeds 50 ppm by volume.

In other words, when the contamination is predominantly fouling, i.e. when Y is equal to 1.5*[Ca]+0.5*[Mg] or equal to 0.5*([Ni]+[Zn]+[Cu]), it is preferable to take a titanium mass fraction of between 0.4 and 0.6, in one embodiment equal to 0.5, and a dosage ratio R of between 2.5 and 3.5, in one embodiment equal to 3.

When the contamination is predominantly corrosive, i.e. when Y is equal to [Na]+[K] or [Pb], it is advantageous to take a titanium mass fraction between 0.1 and 0.3, preferably equal to 0.2, and a dosage ratio R of either: (i) between 4 and 5, in one embodiment equal to 4.5, when the thermal equipment does not include parts made of an alumina-forming superalloy and when the $SO_x$ content in the combustion products does not exceed 50 ppm by volume; or (ii) between 4.5 and 5.5, in one embodiment equal to 5, when the thermal equipment does include parts made of an alumina-forming superalloy or when the $SO_x$ content exceeds 50 ppm by volume. The expressions for the dosage ratio and the "mass fractions" may be written as:

$$[Ti]=tRY \text{ and } [Al]=aRY=(1-t)RY$$

These two equations make it possible to calculate the concentrations of Al and Ti to be introduced into the fuel on the basis of the contaminant contents (parameter Y), necessary dosage ratio (R) and the chosen titanium mass fraction (t).

It should be noted that in the definition of the "dosage ratio" of formula (1), it would be possible to replace the quantity Y in the denominator by the sum of the concentrations of the deleterious metals, i.e.: {[Na]+[K]+1.5[Ca]+0.5[Mg]+[Pb]+0.5([Zn]+[Cu]+[Ni])}. However, the formula used, based on the term Y, is more advantageous as it produces equivalent technical effects for a more economic dosage.

The contaminated fuel may be a gas (for example a raw or incompletely purified biogas), a liquid (for example a petroleum-based fuel, a vegetable oil or an VOME biofuel) or a pulverulent solid (for example coal, biomass or waste) entrained by a gas, for example air. When the contamination derives from a combustion fluid other than the fuel, for example the oxidizer, the treatment applies irrespective of the type of fuel.

The active metal compounds that can be used within the context of the invention and denoted hereafter by "reactants" are those capable of forming, in the combustion chamber of the thermal equipment, $Al_2O_3$ and $TiO_2$ respectively. More precisely, the reactants may be the following:

in the case of aluminum: oxides such as $\alpha$-$Al_2O_3$ or, still better, the $\gamma$-$Al_2O_3$ variety in the form of micron-sized particles (or better still nanoparticles), the hydroxide $Al(OH)_3$ or the hydrated oxide AlOOH (hydrargilite); organic or mineral aluminum salts or aluminum soaps, such as aluminum alkylsulphonates or carboxylates, or else organoaluminum compounds; and in the case of titanium: titanium oxide ($TiO_2$, in the rutile or anatase variety) in micron-sized (or better still nanoscale) form or, better still, titanic acid $Ti(OH)_4$ or hydrated titanium oxide ($TiO_2$-$xH_2O$); water-soluble salts (such as titanyl sulphate or nitrate; mixed titanium ammonium oxalate) or organotitanium compounds.

The possibility of using as reactants an extended family of compounds of the two active metals makes it possible to envisage two ways of introducing the additive into the combustion chambers of the thermal equipment.

The first way uses the gasoil circuit by creating: either (i) a solution of a liposoluble compound of the two active metals in the gasoil; or (ii) a water-in-oil emulsion of water-soluble compounds (salts) of the two active metals in the gasoil; or (iii) a suspension of $Al_2O_3$ (or $Al(OH)_3$) and $TiO_2$ (anhydrous or hydrated form) in the gasoil.

The second way uses a water circuit leading to the combustion chambers by injecting either (i) a solution of an aluminum titanium salt; or (ii) a suspension of insoluble compounds of the two active metals (finely divided oxides or hydrated oxides, in one embodiment of nanoscale size).

As circuit communicating with the chambers, it is possible to use the water injection circuit intended for NO reduction or else a purposely created circuit terminating in nozzles fitted onto the internal face of the combustion chamber covers.

The benefit of the second way is that it extends the field of application of the treatment by hybrid additives to thermal equipment installed in a contaminated environment and equipped for burning only gas.

It has also been shown that the hybrid additives lend themselves to a basic treatment method (called a "prophylactic" treatment) consisting in injecting the additive at a preregulated flow rate, which is constant and determined from the average "net" concentrations of the deleterious metals (which average concentrations have been measured or estimated beforehand over a certain reference period), the averages being calculated over this reference period.

It is also possible to employ what is called a "conservative prophylactic" treatment by considering, this time, not the above chronological averages, but the maximum (measured or estimated) values of the net concentrations of the deleterious metals.

According to an advantageous way of implementing the invention, the method described above is used for protecting the hot parts of thermal equipment: (i) against corrosion by the ash from an alkali metal or from lead; (ii) against fouling by the ash from an alkaline-earth metal, lead or a transition metal (including Ni, Cu, Zn); and (iii) against the combined action of these two types of deleterious metals which may possibly be present simultaneously.

The compounds comprising active metals, e.g., aluminum and titanium, are in liposoluble or water-soluble foam, in the form of a water-in-oil or oil-in-water emulsion or microemulsion or in the form of an aqueous or organic suspension.

The compounds comprising aluminum and titanium are introduced into the combustion chamber of the thermal equipment.

The thermal equipment is for example a gas turbine, the firing temperature of which is above 900° C. and in one embodiment above 1100° C.

EXEMPLIFICATION

The following examples are given to exemplify certain embodiments of the invention and are not considered or intended to limit the invention in any way.

Example 1

The equipment considered here is an advanced-technology gas turbine, referred to as a "third-generation" gas turbine, installed offshore, on the coast or on an island, and burning a perfectly filtered and metal-free commercial natural gas. This gas turbine, the first-stage blades of which are made of an alumina-forming superalloy, is characterized by an air/fuel mass ratio of 40. The maximum "net concentration" of alkali metals relative to the fuel flow rate, and specified by the manufacturer, is 0.25 mg/kg.

In this "contaminated environment", the machine is exposed to sodium pollution brought by the ambient air in the form of sea spray or salt fog. The sodium concentration in the ambient air is on average 0.005 mg/kg but may reach a maximum value of 0.020 mg/kg. The filtration system has an efficiency with respect to aerosols which, not being known a priori, is difficult to measure and is not taken into account here.

The maximum "net concentration" $[Na]_{max}$ of sodium in the combustion chamber, relative to the fuel flow rate, is equal to 40*0.020=0.8 mg/kg. The value of Y is therefore Y=$[Na]_{max}$0.8 mg/kg and the contamination is predominantly corrosive.

With regard to an advanced-technology machine, a conservative treatment is applied by using a high dosage ratio (R=5) and a titanium mass fraction t in the additive equal to 0.2.

The concentrations of Al and Ti to be injected, relative to the fuel flow rate, are given by the following equations:

$$[Ti]=tRY;$$

$$[Al]=aRY=(1-t)RY,$$

where:
R=5
t=0.2 and
Y=0.8 mg/kg, i.e.:
[Al]=3.2 mg/kg and
[Ti]=0.8 mg/kg

This therefore amounts to injecting, per kilogram of fuel, 3.2 mg of aluminum and 0.8 mg of titanium, for example using an additive in which the titanium mass fraction will therefore be 0.2 and the aluminum mass fraction 0.8. This injection may be carried out by aqueous means, via the deNO$_x$ water injection system (for example, injection of aluminum nitrate and titanyl sulphate, which are water-soluble salts) and, if the gas turbine does not have such a deNO$_x$ circuit, through the nozzles fitted on the combustion chamber covers.

It should also be noted that, given the air/fuel flow rate ratio of 40, the net sodium, aluminum and titanium concentrations in the combustion gases are 41 times lower and therefore equal to 19.5 µg/kg, 78 µg/kg and 19.5 µg/kg, respectively.

Example 2

The equipment considered here is a gas turbine of first- or second-generation technology containing no hot parts made of an alumina-forming alloy, for which the fuel specification is to have a maximum of 1 mg/kg of alkali metals and a maximum of 2 mg/kg of calcium. This turbine is equipped with a deNO$_x$ water injection system. The fuel is a heavy distillate, very rich in sulphur (1 wt %) generating an SO$_x$ content in the combustion gases of 200 ppm by volume, said fuel also being endemically contaminated with sodium and calcium, which are both in the form of sulphonates, i.e. soaps very difficult to remove from the fuel by water scrubbing. The measured contents of contaminants are:
between 1.2 and 2.1 mg/kg of sodium, with an average $[Na]_{av}$ of 1.6 mg/kg; and
between 1.5 and 2.5 mg/kg of calcium with an average $[Ca]_{av}$ of 2 mg/kg.

The value of Y is 1.5*$[Ca]_{av}$=3 mg/kg. The contamination is therefore predominantly fouling.

A treatment corresponding to this contamination is applied. The concentrations of Al and Ti to be injected, relative to the fuel flow rate, are again given by:

$$[Ti]=tRY$$

$$[Al]=aRY=(1-t)RY$$

in which:
R=3
t=0.5 and
Y=3 mg/kg.

The calculation gives: [Al]=[Ti]=4.5 mg/kg.

The injection may be carried out as in Example 1.

Although the treatment is adjusted for predominantly fouling contamination, it will also correctly protect against sodium corrosion.

Example 3

The equipment here is a gas turbine of first- or second-generation technology comprising no hot parts made of an alumina-fowling alloy, for which the fuel specification limits the lead content to 1 mg/kg. The fuel is a gasoil containing 0.2% sulphur, generating 40 ppm of SO$_x$ and episodically contaminated with lead tetraethyl. Measured lead content values are between 0.8 and 2 mg/kg with an average of 1.5 mg/kg.

Since the contamination is predominantly corrosive, a treatment using an aluminum-titanium additive is carried out on the basis of the maximum lead content of 2 mg/kg (i.e. a conservative prophylactic treatment) with $Y=[Pb]_{max}=2$ mg/kg.

The titanium mass fraction is 0.2 and the dosage ratio 4.5. The concentrations of Al and Ti to be injected, relative to the fuel flow rate, are again given by:

[Ti]=$t$RY

[Al]=$a$RY=(1−$t$)RY in which:
R=4.5
t=0.2 and
Y=2 mg/kg.

The calculation gives: [Al]=7.2 mg/kg and [Ti]=1.8 mg/kg.

Example 4

The equipment considered here is an already used industrial furnace in the combustion chamber of which a biomass consisting of raw sawdust, which naturally contains potassium and calcium, is burnt. The sulphur content in the biomass is very low (0.01 wt %), thereby generating a very low $SO_x$ content in the flue gases, but the biomass is contaminated by sodium chloride during storage in a marine area. The aim is in particular to limit intervention on the stainless steel flue gas discharge ducts and therefore to reasonably reduce the corrosion and fouling. The sodium and potassium content varies between 5 and 8 ppm with an average of 6 mg/kg and the calcium content varies between 3 and 8 mg/kg with an average of 5 mg/kg. The value of Y (for a non-conservative treatment) is given by:

$Y=1.5*[Ca]_{av}=7.5$ mg/kg, which corresponds to a predominantly fouling contamination.

Consequently, a treatment using an aluminum-titanium additive of the prophylactic type is carried out, taking a titanium mass fraction t of 0.5 (such a dosage of $TiO_2$ is capable of protecting against chloride corrosion) and a dosage ratio of 3.

The concentrations of Al and Ti to be injected, relative to the fuel flow rate, are again given by:

[Ti]=$t$RY

[Al]=$a$RY=(1−$t$)RY in which:
R=3
t=0.5 and
Y=7.5,
i.e.: [Al]=[Ti]=11.25 mg/kg.

It is possible to inject aluminum in the form of hydrargilite $Al(OH)_3$ and the titanium in the form of titanyl sulphate, which are mixed with the sawdust, either in solid form or in aqueous solution form (a solution of $TiOSO_4$ and a suspension of $Al(OH)_3$).

This treatment, although adjusted for a predominantly fouling situation, will also protect against corrosion.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

What is claimed is:

1. A method of operating thermal equipment, wherein said thermal equipment comprises a fuel and an oxidizer and is fed with a number of fluids, at least one of which fluids includes at least one metal selected from the group consisting of alkali metals, lead, alkaline-earth metals and transition metals, said method comprising feeding said thermal equipment with aluminum and titanium, in the form of compounds comprising aluminum and titanium at a dosage ratio R, defined by the expression ([Al]+[Ti])/[Y] in which [Y] represents the maximum of the following values: ([Na]+[K]); (1.5x[Ca]+0.5x[Mg]); [Pb]; 0.5x([Zn]+[Cu]+[Ni]) and the generic notation [M] denotes the mass concentration of the metal "M" in all the fluids supplying the combustion chamber, wherein R is equal to or greater than 2.5, wherein the titanium mass fraction is defined by the expression [Ti]/([Al]+[Ti]), in which [Ti] and [Al] represent the titanium mass concentration and aluminum mass concentration, respectively, in all said fluids feeding said thermal equipment, and wherein the titanium mass fraction has a value equal to or greater than 0.1.

2. The method according to claim 1, wherein said transition metal is nickel, copper or zinc.

3. The method according to claim 1, wherein the titanium mass fraction is: (i) between 0.4 and 0.6 when Y is equal to (1.5*[Ca]+0.5*[Mg]) or equal to 0.5*([Zn]+[Cu]+[Ni]); or (ii) between 0.1 and 0.3 when Y is equal to ([Na]+[K]) or [Pb].

4. The method according to claim 3, wherein the titanium mass fraction is equal to 0.5 when Y is equal to (1.5*[Ca]+0.5*[Mg]) or Y is equal to 0.5*([Zn]+[Cu]+[Ni]).

5. The method according to claim 3, wherein the titanium mass fraction is equal to 0.2 when Y is equal to ([Na]+[K]) or [Pb].

6. The method according to claim 1, wherein the dosage ratio R is:
  (i) between 2.5 and 3.5 when Y is equal to (1.5*[Ca]+0.5*[Mg]) or equal to 0.5*([Zn]+[Cu]+[Ni]);
  (ii) between 4 and 5 when Y is equal to ([Na]+[K]) or [Pb], when the thermal equipment does not include parts made of an alumina-forming superalloy and when the $SO_x$ content in the combustion products does not exceed 50 ppm by volume; or
  (iii) between 4.5 and 5.5 when Y is equal to ([Na]+[K]) or [Pb] and when the thermal equipment includes parts made of an alumina-forming superalloy or when the $SO_x$ content in the combustion products exceeds 50 ppm by volume.

7. The method according to claim 6, wherein the dosage ratio R is equal to 3 when Y is equal to (1.5*[Ca]+0.5*[Mg]) or Y is equal to 0.5*([Zn]+[Cu]+[Ni]).

8. The method according to claim 6, wherein the dosage ratio R is equal to 4.5 when Y is equal to ([Na]+[K]) or [Pb].

9. The method according to claim 6, wherein the dosage ratio R is equal to 5 when Y is equal to ([Na]+[K]) or [Pb] and when the thermal equipment includes parts made of an alumina-forming superalloy or when the $SO_x$ content in products of combustion exceeds 50 ppm by volume.

10. The method according to claim 1, wherein the compounds comprising aluminum and titanium are in a form selected from the group consisting of a liposoluble form, a water-soluble form, a water-in-oil emulsion or microemulsion; an oil-in-water emulsion or microemulsion, an aqueous suspension and an organic suspension.

11. The method according to claim 10, wherein the compounds comprising aluminum and titanium are the form of an aqueous or an organic nanoscale suspension.

12. The method according to claim 1, wherein said thermal equipment comprises a combustion chamber and the method further comprises feeding the compounds comprising aluminum and titanium into the combustion chamber.

13. The method according to claim 1, wherein the thermal equipment is selected from the group consisting of gas turbines, diesel engines, boilers, furnaces, incinerators and aircraft jet engines.

14. The method of claim 13, wherein the thermal equipment is a gas turbine having a firing temperature that is equal to or greater than 900° C.

15. A method for protecting hot parts of thermal equipment from:
(i) corrosion by ash from an alkali metal or from lead;
(ii) fouling by ash of an alkaline-earth metal, lead or a transition metal; and
(iii) the combined effects of an alkali metal, lead, an alkaline-earth metal or a transition metal;
wherein said thermal equipment comprises a fuel and oxidizer and is fed with a number of fluids, at least one of which fluids includes at least one metal selected from the group consisting of alkali metals, lead, alkaline-earth metals and transition metals, said method comprising feeding said thermal equipment with aluminum and titanium, in the form of compounds comprising aluminum and titanium at a dosage ratio R, defined by the expression $([Al]+[Ti])/[Y]$ in which $[Y]$ represents the maximum of the following values: $([Na]+[K])$; $(1.5 \times [Ca]+0.5 \times [Mg])$; $[Pb]$; $0.5 \times ([Zn]+[Cu]+[Ni])$ and the generic notation $[M]$ denotes the mass concentration of the metal "M" in all the fluids supplying the combustion chamber, wherein R is equal to or greater than 2.5, wherein the titanium mass fraction is defined by the expression $[Ti]/([Al]+[Ti])$, in which $[Ti]$ and $[Al]$ represent the titanium mass concentration and aluminum mass concentration, respectively, in all said fluids feeding said thermal equipment, and wherein the titanium mass fraction has a value equal to or greater than 0.1.

16. The method according to claim 15, wherein said transition metal is nickel, copper or zinc.

17. The method according to claim 15, wherein the titanium mass fraction is either: (i) between 0.4 and 0.6 when Y is equal to $(1.5*[Ca]+0.5*[Mg])$ or equal to $0.5*([Zn]+[Cu]+[Ni])$; or (ii) between 0.1 and 0.3 when Y is equal to $([Na]+[K])$ or $[Pb]$.

18. The method according to claim 15, wherein the dosage ratio R is:
(i) between 2.5 and 3.5 when Y is equal to $(1.5*[Ca]+0.5*[Mg])$ or equal to $0.5*([Zn]+[Cu]+[Ni])$;
(ii) between 4 and 5 when Y is equal to $([Na]+[K])$ or $[Pb]$, when the thermal equipment does not include parts made of an alumina-forming superalloy and when the $SO_x$ content in the combustion products does not exceed 50 ppm by volume; or
(iii) between 4.5 and 5.5 when Y is equal to $([Na]+[K])$ or $[Pb]$ and when the thermal equipment includes parts made of an alumina-forming superalloy or when the $SO_x$ content in the combustion products exceeds 50 ppm by volume.

* * * * *